United States Patent [19]

Denker

[11] Patent Number: 4,622,863
[45] Date of Patent: Nov. 18, 1986

[54] SHOE CLEAT ENGAGEMENT BICYCLE PEDAL

[76] Inventor: Stanley D. Denker, Rte. 3, New Richmond, Wis. 54017

[21] Appl. No.: 663,595

[22] Filed: Oct. 22, 1984

[51] Int. Cl.[4] .................................................. G05G 1/16
[52] U.S. Cl. ..................................... 74/594.6; 74/594.4
[58] Field of Search ................ 74/594.1, 594.4, 594.6, 74/594.7; 280/611; 36/131; D12/125

[56] References Cited

U.S. PATENT DOCUMENTS

| 243,346 | 6/1881 | Price | 74/594.4 |
|---|---|---|---|
| 2,512,841 | 6/1950 | Streifthau | 74/594.4 |
| 3,320,826 | 5/1967 | Morse | 74/594.4 |
| 4,089,236 | 5/1978 | Genzling | 280/611 |
| 4,398,434 | 8/1983 | Kimura | 74/594.4 |
| 4,445,397 | 5/1984 | Shimano | 74/594.6 |

FOREIGN PATENT DOCUMENTS

| 3315282 | 10/1984 | Fed. Rep. of Germany | 74/594.6 |
|---|---|---|---|
| 550970 | 5/1922 | France | 74/594.4 |
| 875354 | 9/1941 | France | 74/594.6 |
| 55497 | 12/1942 | France | 74/594.7 |
| 1248799 | 2/1960 | France | 74/594.4 |
| 8001056 | 5/1980 | World Int. Prop. O. | 74/594.6 |
| 16829 | of 1909 | United Kingdom | 74/594.6 |
| 624048 | 5/1949 | United Kingdom | 74/594.4 |

*Primary Examiner*—Thomas J. Holko
*Assistant Examiner*—Carl M. DeFranco
*Attorney, Agent, or Firm*—Orrin M. Haugen; Thomas J. Nikolai

[57] ABSTRACT

An improved bicycle pedal which positively grips the biker's shoe for imparting force to the crank assembly on both the upward and downward stroke of the biker's foot. The pedal comprises a molded tubular member having a longitudinal bore for receiving an axle member therein and having an integrally formed, generally flat surface projecting laterally outward from the cylindrical member and generally tangent thereto. The flat surface member is notched with the edges of the notch being chamfered so as to be wider at the base than at the top. A cleat of a shape adapted to mate with the notch is attached to the sole of the bikers's shoe. When the sole of the biker's shoe is placed on the generally flat surface, the cleat fits into the notch and a beveled portion of the cleat mates with the chamfered edge of the pedal in dove-tail fashion to releasably lock the biker's shoe to the pedal.

7 Claims, 6 Drawing Figures

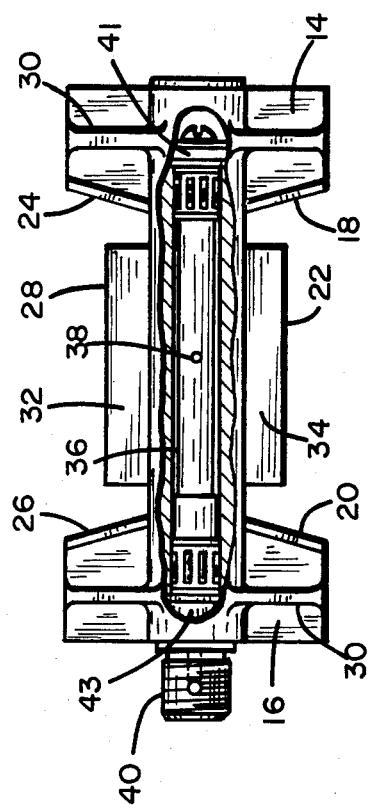
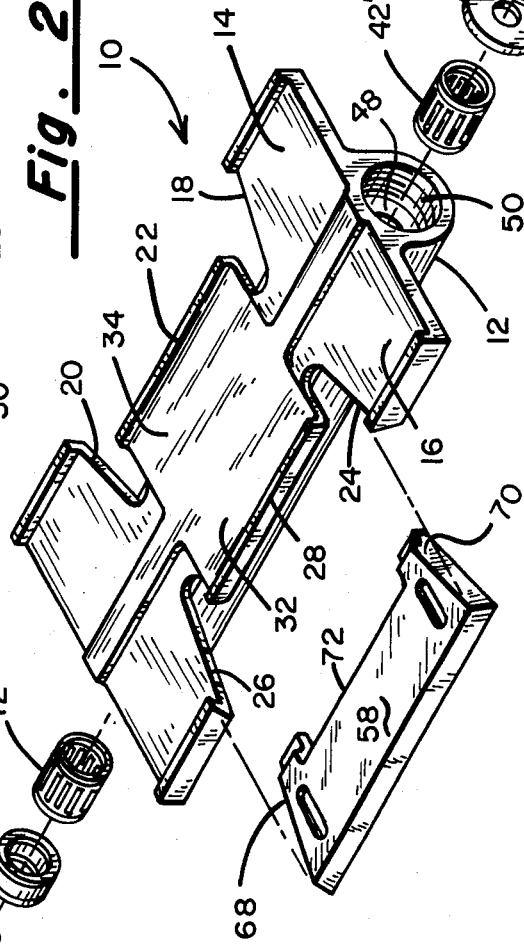
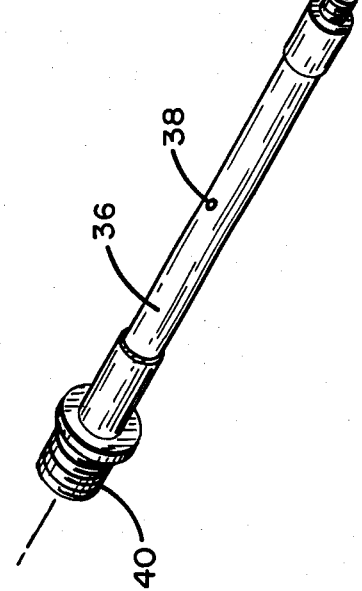
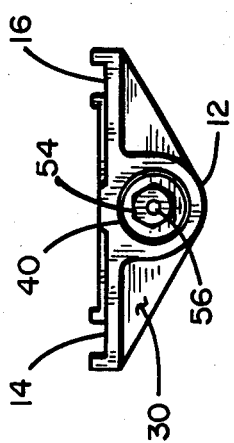

SHOE CLEAT ENGAGEMENT BICYCLE PEDAL

BACKGROUND OF THE INVENTION

I. Field of the Invention

This invention relates generally to the construction of bicycle pedals, and more specifically to an improved arrangement whereby the bicycle pedal is releasably locked to the sole of the biker's shoe so that positive forces are applied to the crank of the bicycle throughout the entire pedaling motion.

II. Discussion of the Prior Art

On racing or touring bicycles, greater pedaling efficiency results where the biker's foot applies force to the pedal on both the upstroke and the downstroke portion of the pedaling motion. In the past, pedals have been designed in which an axle secured to the crank has two spaced-apart flanges journaled for rotation about the axle and pairs of rubber blocks are secured between the two flanges, the rubber blocks providing flat surfaces against which the biker's shoe sole coacts. On racing and touring bikes, it has been the practice to also secure a metal basket-like structure on the flanges for receiving the toe portion of the biker's shoe and leather straps have been used to hold the shoe with the biker's toe in the basket.

This prior art pedal construction has a number of serious defects. First of all, the construction makes the pedal assembly excessively heavy, the trend in racing and touring bikes being to reduce the overall weight of the bicycle as much as possible. Secondly, because of the manner in which the biker's foot is secured to the pedal, in an emergency situation, time may be lost in attempting to disengage the foot from the pedal. Additionally, the weight of the basket structure tends to invert the pedal when it is not secured to the foot, such as when the biker first begins a ride and the basket rubs on the ground and is somewhat difficult to flip over so as to be in a position to allow his or her toe to be inserted into the basket.

OBJECTS

It is accordingly a principal object of the present invention to provide a new and improved arrangement for bicycles.

Another object of the invention is to provide a pedal arrangement which is easily coupled to the foot of the biker so that pumping forces are applied to the crank and drive sprocket during both the upward and downward strokes of the biker's foot.

Yet another object of the invention is to provide a pedal arrangement of the type described in the foregoing paragraph which is light in weight and which exhibits low friction between the relatively moving parts thereof.

Yet another object of the invention is to provide a bicycle pedal and a mating cleat arrangement for the biker's shoe which engage the pedal and releasably lock the pedal to the biker's shoe.

A yet still further object of the invention is to provide a bicycle pedal arrangement which positively locks to the biker's shoe but which can quickly be released.

SUMMARY OF THE INVENTION

The foregoing objects, advantages and features of the invention are achieved through the provision of a molded plastic or light-weight metal member having a central tubular portion and integrally formed wing-like extensions projecting generally tangentially from the tubular member. The inside diameter of the tubular member is dimensioned to receive suitable bearings for journaling the steel axle, which is threaded at one end, for mating with a threaded bore formed on the end of the bicycle's crank. In a first embodiment, the laterally extending, flat wing-like surface is notched and the laterally extending side edges of the notch are inwardly directed at a predetermined angle toward one another and are downwardly and outwardly beveled, the notch further being tapered inwardly in going from the outer edge of the wing-like extension toward the mid-line of the pedal. In an alternative arrangement, the top surface of the wing-like extensions has a recess or a predetermined shape with the undersurface of the recess being chamferred and undercut along a line transverse to the tubular member.

Completing the pedal assembly of the present invention is a metal chest which is intended to be secured to the exposed surface of the shoe's sole generally proximate the location of the ball of the foot when the shoe is worn. For use with the first described embodiment, the cleat also has its side edges beveled and is suitably tapered so as to fit within the notch of the pedal. The beveled edges on the cleat thus dove-tail with the side beveled edge surfaces of the notch formed in the wing-like extensions of the pedal. Hence, when the toe of the biker's shoe is placed on the pedal and the foot is slipped rearward relative to the top surface of the pedal, the cleat mates with the pedal and the pedal becomes positively locked to the biker's shoe and remains so during both the upward and downward pedaling stroke. To free the cleat and hence the biker's foot from the pedal, the biker need only slip his foot a short distance forward relative to the pedal whereby the cleat slips out of its dove-tailed relation to the pedal.

For use with the second embodiment described above, the cleat comprises a generally rectangular plate having upwardly chamferred leading and trailing edges, the cleat being so dimensioned that it can fit through the recess formed in the top surface of the wing-like projections on the pedal and then, when the shoe is rotated to align the cleat with the direction of travel of the bicycle, the leading and trailing edges of the cleat fit into the undercut portion of the recess formed in the pedal. This action positively locks the cleat to the pedal so that both pulling and pushing forces are applied to the pedal by the pedaling action of the rider. To disengage the cleat from the pedal, the rider need only to rotate his foot approximately 15 degrees so that the cleat no longer is bound by the undercut portion of the pedal surface and the foot can be lifted free.

A better understanding of the construction and mode of use of the bicycle pedal of the present invention as well as other objects and advantages thereof become apparent to those skilled in the art from the foregoing detailed description of the preferred embodiment, especially when considered in conjunction with the accompanying drawings in which like numerals in the several views refer to corresponding parts.

DESCRIPTION OF THE DRAWINGS

FIG. 1 is a blown-apart perspective view of a first embodiment of the invention;

FIG. 2 is a bottom view of the embodiment of FIG. 1;

FIG. 3 is an end view of the embodiment of FIG. 2;

DESCRIPTION OF THE PREFERRED EMBODIMENTS

Figure 4:
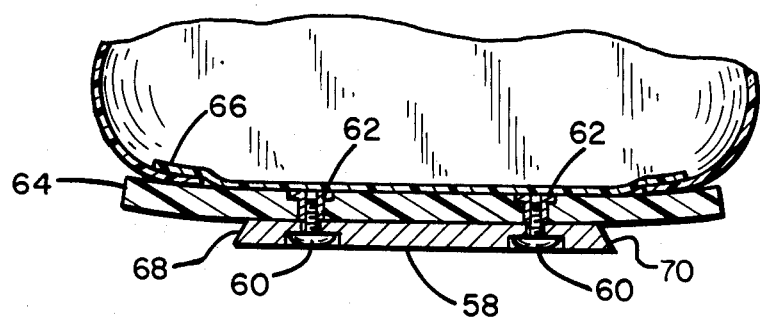
FIG. 4 shows the manner in which the cleat of FIG. 1 is secured to a shoe.

Referring first to FIG. 1, there is shown in blown-apart perspective form the constructional features of a first embodiment of the improved bicycle pedal indicated generally by numeral 10. It is seen to comprise a tubular axle housing 12 and extending tangentially from the axle housing 12 and molded integrally therewith are lateral wing-like surfaces 14 and 16. Each of the wing-like surfaces has an inwardly-extending notch. The notch in the wing projection 14 is shown as being defined by the edges 18, 20 and 22 and the notch in the wing extension 16 being defined by the edges 24, 26 and 28.

Referring to FIG. 2, which shows the underside of the pedal, it can seen that integrally-formed, triangularly-shaped reinforcing gussets as at 30 are provided and which extend from the tubular portion 12 to the extremity of the wing elements 14 and 16. These gussets provide greater rigidity and strength to the structure without adding undue weight. Also, it is be noted from FIG. 2 that the edges 22 and 28 are projections which extend tangentially outward from the tubular axle-receiving member 12. These extensions are identified by numerals 32 and 34.

Referring again to FIG. 1, an axle member 36, which may be formed from cold rolled steel or other suitable material, is arranged to fit within the longitudinal bore formed in the tubular member 12, the axle 36 being itself tubular in construction and having a radially-extending bore 38 passing through the side wall thereof and communicating with the longitudinal central bore of the tubular member 36. Formed on one end of the tubular axle member 36 is a threaded portion 40 which is intended to mate with a threaded opening at the end of the bicycle's crank to allow attachment of the pedal to the crank. Before the axle member 36 is inserted into the longitudinal bore of the tubular portion 12 of the pedal 10, suitable bearings as at 42 and 42' and a felt seal assembly 43 are inserted into the opposed ends of the tubular portion 12 so that the axle member 36 is journaled for rotation within that tubular bore with low friction between the mating parts. Once the axle member 36 is inserted into the barrel portion 12 of the pedal, a pair of hardened thrust washers as at 44 are disposed on opposite sides of a roller thrust bearing 45 and are inserted into the right end of the bore (ref. FIG. 1), the washers having a central aperture therethrough for fitting about the nose portion 41 on the end of the axle 36 opposite to the threaded end 40. The nose-like projection 41 is internally threaded for receiving a screw 46. This screw holds the washers 44 in place on the end of the axle member and the washers abut the shoulder 48 which is at the base of the internally threaded counterbore 50. Once the washers 44 and bearing 45 along with the screw 46 are assembled to the end of the axle member, a plug 52 having external threads 54 is inserted into the internally-threaded counterbore 50 and tightened down.

Referring to FIG. 3, there is shown an end view of the left end of the pedal and it can be seen that there is formed in the end of the axle 40 a hexagonal counterbore 54 into which a suitable Allen wrench may be fitted for tightening the pedal onto the crank of the bicycle. Centrally disposed within the hexagonal opening is a spring-loaded ball check valve 56 through which lubricating oil may be injected, the ball check valve acting as a seal to preclude the outflow of the oil. The lubricating oil may flow through the central tubular bore of the axle member 36 and may exit the weep hole 38 to provide a film of lubrication to the bearings 42 supporting the axle 36.

Referring again to FIG. 1 and to FIG. 4, also forming a part of the pedal assembly 10 is a metal cleat 58 which is adapted to be affixed to the exterior sole of the biker's shoe by means of screws 60 which mate with conventional T-nuts 62 which pass through the shoe sole 64 and which are covered by an insole member 66.

As can be seen from FIGS. 1 and 4, at least the edges 68 and 70 of the cleat 58 are downwardly and outwardly chamferred so as to mate with the corresponding chamferred edges 24 and 26 of the wing-like extension 16 in a dove-tail fashion. The forward edge 72 of the cleat 58 may abut the front edge of laterally-extending wing portion 32. The forward edge 72 may also be downwardly and outwardly chamferred to mate with a similarly beveled front edge of the notch in the wing portion 32, although that is not essential to a proper working of the invention. Thus, throughout the entire pedaling stroke, either a lifting force or a downward force will be applied to the pedal. In an emergency situation, the biker may readily detach or unlock his foot from the pedal by merely bringing his foot forward (ref. FIG. 1) whereby the cleat becomes disengaged from the longitudinal edge of the wing portion 32 and the edges 68 and 70 of the cleat no longer mate with the correspondingly dove-tailed edges 24 and 26 of the pedal.

It is recognized that various modifications may be made to the embodiment thus far described. Specifically, rather than using needle bearings 42 and 42', suitable sleeve bearings may be substituted. Furthermore, the pedal itself may be made from a variety of materials such as plastic and metal. Where light weight and strength must be combined, the integrally formed portions 12, 14 and 16 may be fabricated from titanium. This option, although somewhat expensive from the standpoint of materials, may appeal to persons engaged in bicycling competitions.

ALTERNATIVE EMBODIMENT

Figure 5:
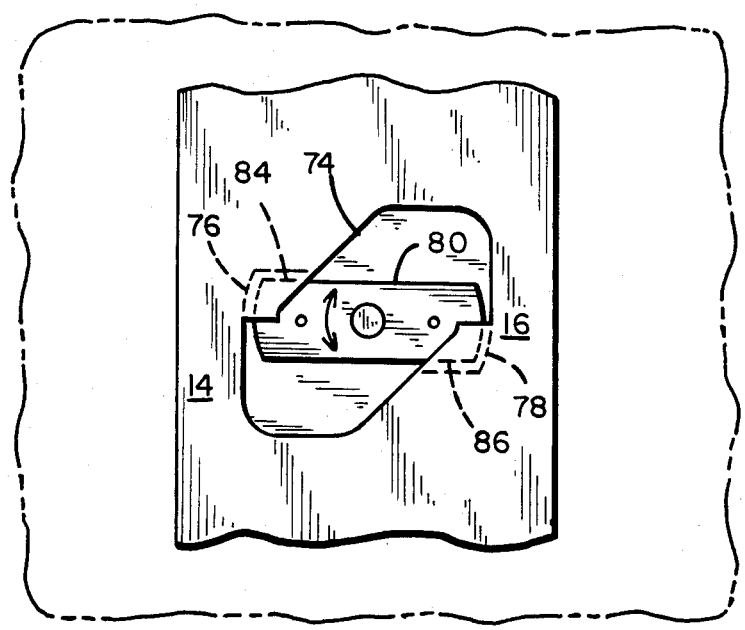
FIG. 5 illustrates an alternative arrangement for releasably locking the shoe cleat to the bicycle pedal.
Figure 6:
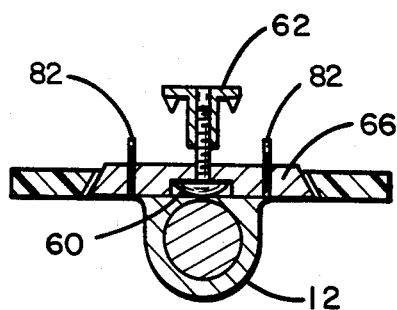
FIG. 6 is a side sectional view of the embodiment of FIG. 5, but with the shoe sole removed for clarity in the drawing.

Referring next to FIGS. 5 and 6, an alternative arrangement is disclosed for coupling a shoe cleat to the pedal. Rather than employing a front-entry dove-tail coupling as with the embodiment previously described, it has also been found convenient to form a vertical recess 74 in the top surface of the wing-like tangential extensions, the recess being elongated about an axis which is oblique with respect to the longitudinal axis of the pedal. The recess 74 is undercut as at 76 and 78. The shoe cleat 80 is affixed to the underside of the shoe proximate the ball of the foot and, again, is held in place by means of a T-nut 62 and a screw 60. Furthermore, integrally formed pins as at 82 may be used to preclude rotation of the cleat relative to the shoe sole.

As is indicated in FIG. 5, with the embodiment illustrated there, the biker may step down on the pedal with his foot turned at an appropriate angle with respect to the axis of the pedal so that the cleat 80 fits within the recess 74. Then, by rotating the foot slightly, the edges 70 and 72 of the cleat will fit within the undercut portions 76 and 78 of the pedal, locking the pedal to the foot. Again, in an emergency situation, the biker may readily disengage his foot from the pedal by merely cocking his foot to align the cleat with the recess and the foot can then lift free of the pedal.

In the embodiment of FIGS. 5 and 6, the axle structure and method of journaling it in the pedal is the same as already described in connection with the first embodiment, and need not be repeated.

The invention has been described herein in considerable detail in order to comply with the Patent Statutes and to provide those skilled in the art with the information needed to apply the novel principles, and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. An improved bicycle pedal comprising:
   (a) a foot engaging member having a centrally disposed tubular segment with generally flat, integrally formed, wing elements extending tangentially in opposed direction from said tubular segment along the length dimension thereof, said wing elements each having a notch formed therethrough, the inwardly extending lateral edges defining one of said notches being downwardly and outwardly chamfered and inwardly directed at a predetermined angle toward one another;
   (b) bearing means disposed in said tubular segment; and
   (c) an axle member journaled for rotation in said bearing means, said axle member having a threaded end portion extending outwardly from said tubular segment when said axle member is journaled in said bearing means.

2. The improved bicycle pedal as in claim 1 and further including a cleat member attachable to the shoe sole of the biker, said cleat member being dimensioned to fit within said one of said notches and being chamfered downwardly and outward and tapered in accordance with said predetermined angle to dove tail with the chamfered edges of said notches.

3. The improved bicycle pedal of claim 1 wherein said bearing means comprises first and second sleeve bearings positioned proximate each end of said tubular segment.

4. The improved bicycle pedal as in claim 1 wherein said bearing means comprise first and second needle bearing assemblies positioned proximate each end of said tubular segment.

5. The improved bicycle pedal as in claim 1 wherein said axle member comprises a cylindrical metal tube having an outside diameter slightly less than the inside diameter of said tubular segment to fit freely therein; a weep hole extending through the wall of said metal tube communicating with the longitudinal bore of said metal tube and a ball check valve disposed in said threaded end portion through which lubricating fluid may be injected into said longitudinal bore of said metal tube.

6. The improved bicycle pedal as in claim 5 wherein the end portion of said axle opposite said threaded end portion is recessed within said tubular segment of said foot engaging member, the end of said tubular segment opposite the end from which said threaded end of said axle extends being internally threaded for a predetermined distance; and a threaded end cap member screwed into said internally threaded portion of said tubular segment of said foot engaging member for limiting the axial thrust of said axle member within said tubular segment.

7. The improved bicycle pedal of claim 2 wherein said notches define a central flange projecting laterally outside from said tubular segment, the forward edge of said cleat member insertable beneath said central flange when said shoe sole rests atop said wing elements.

* * * * *